March 10, 1964 L. M. DAVIS 3,124,362

SELF-CLEANING PISTON RING

Filed Sept. 20, 1961

INVENTOR.
LEWIS M. DAVIS
BY
Barnes, Kisselle, Raisch & Choate
ATTORNEYS

United States Patent Office 3,124,362
Patented Mar. 10, 1964

3,124,362
SELF-CLEANING PISTON RING
Lewis M. Davis, Muskegon, Mich., assignor to Sealed Power Corporation, Muskegon, Mich., a corporation of Michigan
Filed Sept. 20, 1961, Ser. No. 139,551
10 Claims. (Cl. 277—24)

This invention relates to a piston ring and more particularly to a piston ring assembly utilizing a floating element operative to provide a self-cleaning action in the ring assembly.

When oil ring assemblies of the type utilizing an expander spring are subjected to operating conditions in which high oil temperatures are encountered, such as in heavy duty, constant high speed truck operation the oil flowing through the ring assembly tends to decompose and form hard deposits at those points where the flow of oil is restricted. Such deposits will restrict the spring action of the expander if allowed to build up between the expander and the cylinder wall engaging rails of the ring assembly, thereby preventing the expander from effectively exerting radial force against the rails. When this occurs, oil control between the crankcase and the combustion chamber drops off to such an extent that the oil ring is rendered practically useless long before it is actually worn out.

It is an object of the present invention to provide an improved piston oil ring assembly operable with a self-cleaning action to prevent carbon build-up in the parts thereof.

Another object is to provide an improved self-cleaning piston ring assembly adaptable to a wide range of oil groove sizes and capable of developing sufficiently high radial thrust expansion forces for practical operation in relatively narrow oil grooves.

A further object is to provide an improved piston oil ring assembly of the self-cleaning type having a relatively large oil venting capacity.

One feature of the present invention is the provision of a one-piece floating member which functions as a spacer for the cylinder wall engaging rail or rails in addition to acting as a cleaning member.

Another feature is the provision of a floating spacer member of the above character which cooperates with an expander spring for the cylinder engaging rail to provide a self-cleaning piston oil ring assembly having a minimum of overall axial thickness.

Figure 1:
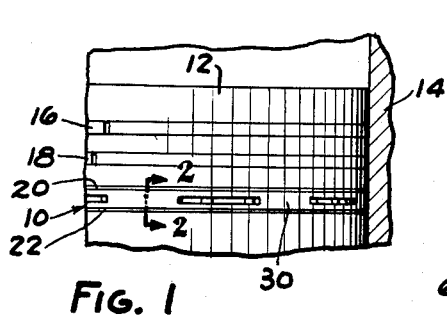
Figure 2:
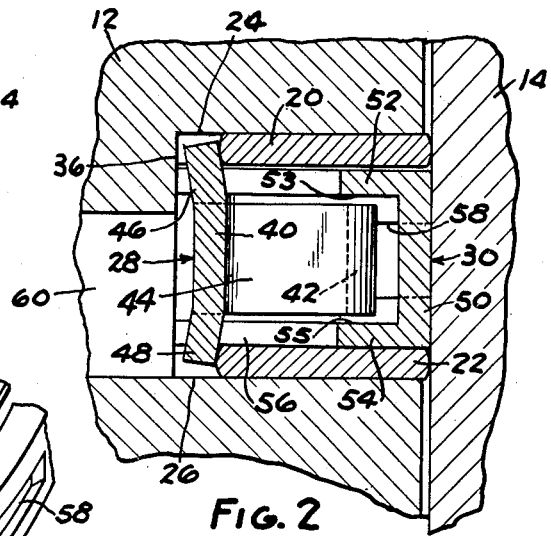
Figure 4:
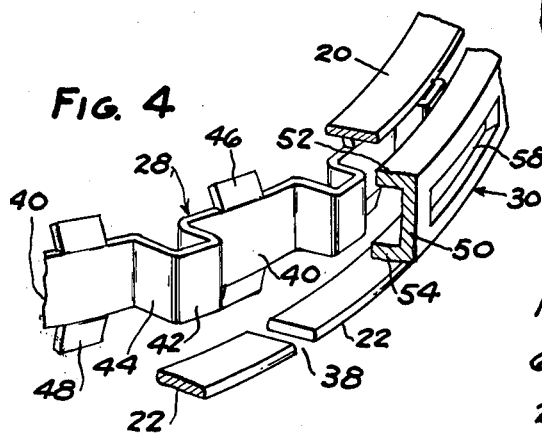
Figure 3:
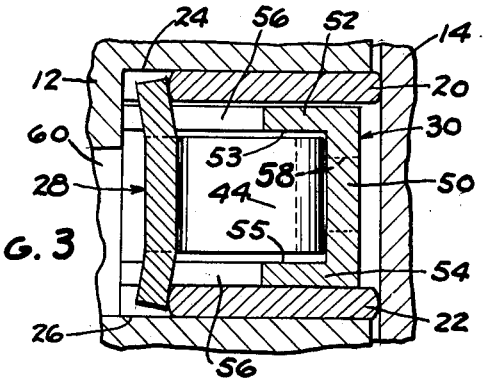
Figure 6:
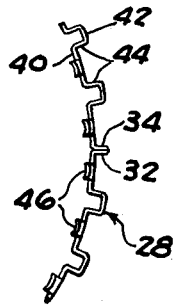
Figure 5:
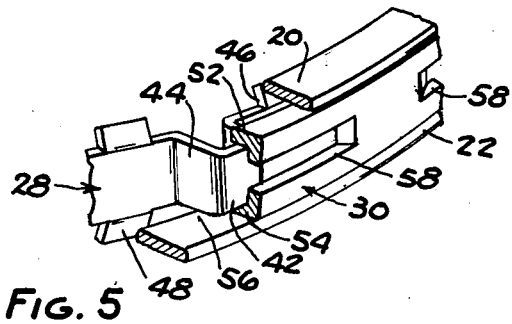

In the accompanying drawing:
FIG. 1 is an elevational fragmentary view of a piston equipped with an oil ring assembly constructed in accordance with the invention.
FIG. 2 is a greatly enlarged sectional view taken on the line 2—2 of FIG. 1.
FIG. 3 is a sectional view also taken on the line 2—2 of FIG. 1 illustrating the floating spacer of the oil ring assembly shifted radially inward from its position in FIG. 2.
FIG. 4 is an enlarged fragmentary exploded perspective view of the oil ring assembly.
FIG. 5 is an enlarged fragmentary perspective view of the oil ring assembly with the parts thereof in assembled relation.
FIG. 6 is a fragmentary plan view of an expander spring of the assembly.

Referring in more detail to the accompanying drawing, FIG. 1 illustrates a piston oil ring assembly 10 constructed in accordance with the present invention installed in the lower oil groove of a piston 12 reciprocable in a cylinder 14 of an internal combustion engine. In accordance with conventional practice, oil ring assembly 10 prevents passage of oil upward between the piston and the wall of cylinder 14, while conventional split, solid cast iron piston rings 16 and 18 are mounted in the upper and middle grooves of piston 12 to provide a compression seal.

Referring to FIGS. 2 and 4, oil ring assembly 10 includes upper and lower thin flat steel segment rails 20 and 22 positioned respectively adjacent the top and bottom walls 24 and 26 of the oil ring groove of piston 12. Rails 20 and 22 are conventional, being provided with chromium plated outer bearing edges having long wear life to withstand continuous sliding contact against the wall of cylinder 14. Rails 20, 22 are urged radially outward by an expander spring 28 and are held in axially spaced positions by a one-piece spacer 30.

Expander spring 28 is a one-piece, radially corrugated member generally circular in outline which may be readily punched from flat ribbon stock of spring material, such as stainless steel, and curved into a split ring. Expander 28 is preferably of the circumferential abutment type; that is, the radially extending ends 32, 34 thereof (FIG. 6) are adapted to abut together when the expander is compressed to its operating position behind rails 20, 22. The diameter of expander 28 in the compressed abutting condition thereof is larger than the inside diameter of the piston oil groove so that the expander is free to develop an equal load outward around its entire periphery to insure conformity of the scraping edges of rails 20, 22 with the changing irregularities of the wall of cylinder 14. The rails 20, 22, on the other hand, are designed so that the gaps 38 (FIG. 4) respectively provided between the ends of these rails will vary in width but remain open when the rails are in operation and compressed to bore diameter to permit radial expansion and contraction of the rails.

As best shown in FIGS. 4 and 6, expander 28 consists of a series of circumferentially spaced and alternating inner and outer crowns 40 and 42 which are joined by parallel, radially extending solid leg portions 44. Each inner crown 40 has a pair of short integral lips 46 and 48 extending a predetermined distance from the respective upper and lower longitudinal edges of the inner crowns. The upper and lower lips 46, 48 are preferably inclined radially inward approximately 8 to 13 degrees relative to the axis of ring assembly 10 in order to develop an axial component of force for urging the inner peripheral edges of rails 20, 22 axially apart against the top and bottom walls 24, 26 of the oil groove.

Spacer member 30 comprises a one-piece annular parted segment ring which is C-shaped in radial cross section (FIGS. 2 and 3), having a vertical wall 50 and a pair of top and bottom flanges or walls 52 and 54 which extend radially inward therefrom flush with the top and bottom edges of vertical wall 50. The axial dimension of spacer 30 is designed to maintain the outer peripheries of rails 20, 22 spaced from one another and in close sliding contact with the top and bottom walls 24, 26 of the oil groove. However, the total axial dimension of spacer 30 plus that of upper and lower rails 20 and 22 is a few thousandths of an inch less than axial distance between the top and bottom walls 24 and 26 of the oil groove to permit movement of these parts relative to one another in circumferential and radial directions. The oppositely facing sides 53 and 55 of top and bottom walls 52, 54 of spacer 30 are spaced vertically apart by a sufficient distance to allow legs 44 and outer crown 42 of expander 28 to enter therebetween with a clearance fit. It is to be noted that the upper and lower edges of legs 44 and outer crown 42 are parallel with one another and form a continuation of the upper and lower edges of the inner crowns, and thus a large clearance space 56 (FIGS. 2 and 3) exists between these edges and the rails 20, 22 adjacent thereto. The vertical wall 50 of spacer 30 is provided with a series of evenly spaced oil drainage slots 58 which extend radially therethrough and which circumferentially encompass approximately three of the outer crowns 42 of expander 28.

Spacer 30 may be machined from cast iron or punched and formed from flat steel ribbon stock. With either construction the diameter of spacer 30 in the free condition thereof is less than that of the bore of cylinder 14 but greater than the outer operating diameter of expander 28. Thus, when spacer 30 is assembled between rails 20, 22, and oil ring assembly 10 is compressed to operating position in the cylinder, spacer 30 is free to move radially between the cylinder wall and the outer crowns 42 of expander 28, as illustrated by the respective positions of spacer 30 in FIGS. 2 and 3. The above dimensional relationship between the parts of the oil ring assembly also allows spacer 30 to rotate circumferentially relative to both expander 28 and rails 20, 22. Expander 28 is dimensioned so that there is sufficient clearance between the upper and lower lips 46, 48 thereof and the respectively adjacent walls 24, 26 of the oil groove to permit expander 28 to shift axially of the piston until such movement is stopped by the upper and lower edges of legs 44 and outer crowns 42 contacting the respectively adjacent top and bottom walls 52, 54 of spacer 30.

In operation, as piston 12 reciprocates in cylinder 14, rails 20, 22 radially expand and contract as normal variations are encountered in cylinder diameter and as the piston tilts and shifts laterally in position in the cylinder. The outer peripheral edges of rails 20, 22 are maintained in sealing contact with the wall of cylinder 14 by the tension of the rails themselves as well as by the pressure of expander 28 acting against rails 20, 22 through lips 46, 48 of the expander. This movement of oil ring assembly 10 in response to piston movement automatically keeps the floating spacer 30 constantly in motion relative to rails 20, 22 and expander 28. This random, floating rotational and radial motion of spacer 30 provides a self-cleaning action with respect to those surfaces of the oil ring assembly 10 which are adjacent the spacer. The oil which is trapped between rails 20 and 22 drains inwardly through the oil slots 58 of spacer 30 and then is free to pass inwardly of ring assembly 10 via the large oil clearance space 56 existing between the upper and lower longitudinal edges of legs 44 and inner crowns 40 of expander 28 and the respectively adjacent surfaces of rails 20, 22. Oil collecting at the back of the oil groove is drained therefrom by a series of oil holes 60 connecting the back wall 36 of the oil groove with the hollow interior of piston 12.

Due to the above relative motion between spacer 30 and rails 20, 22 deposit forming substances have no opportunity to build up on the adjacent surfaces thereof. Moreover, the contact of the upper and lower edges of outer crowns 42 and legs 44 of expander 28 with spacer 30 results in a scraping and pounding action which will remove any deposits tending to form on the facing surfaces 53 and 55 of top and bottom walls 52 and 54 of spacer 30. The random contact of the outer face of outer crowns 42 with the inner surface of vertical wall 50 of spacer 30 prevents deposit formation along those edges of oil slots 58 nearest to the crowns. The provision of the large oil venting clearance space 56 between expander 28 and bottom rail 22 also assists in preventing the formation of clogging deposits.

In addition to the above described self-cleaning action an oil ring assembly constructed in accordance with the present invention permits a reduction in the overall axial dimension of the assembly so that it can be made to fit narrow oil grooves, e.g., those having an axial dimension of 3/16 of an inch. However, it is understood that the present ring assembly is useful in both wider and narrower ring grooves. By providing sufficient clearance for passage of oil past the top and bottom edges of expander 28 rather than through slots in the center thereof, the inner and outer crowns 40 and 42 and legs 44 of the expander may all be made solid. Hence, the axial or vertical dimensions thereof can be reduced to shorten the axial dimension of the overall oil ring assembly while still leaving sufficient material in the expander to provide the required spring tension on the oil ring assembly.

I claim:

1. A ring assembly for use in a ring groove of a piston comprising an annular cylinder-engaging element, an annular spacer disposed adjacent said element for positioning said element axially in the groove and an expander for engaging and urging said element radially outward, said spacer having outer and inner diameters in the operating condition thereof respectively smaller and larger than the outer and inner operating diameters of said element to permit said spacer to float radially and circumferentially relative to said element and said expander, said expander comprising a radially corrugated ribbon of flat metal having alternating series of circumferentially extending inner and outer crowns and substantially radially extending legs joining the outer and inner crowns together, said spacer having a circumferentially extending recess in the inner periphery thereof adapted to receive said outer crowns and said legs of said expander with a clearance fit.

2. The combination set forth in claim 1 wherein said outer crowns of said expander are spaced radially outward of said inner crowns of said expander a distance sufficient to maintain said spacer near the outer periphery of said annular cylinder-engaging element.

3. The combination set forth in claim 2 wherein said inner crowns of said expander have lip portions extending therefrom for engaging the inner periphery of said element, said lip portions being inclined radially inward at an angle to the axis of said ring to provide an axial force on the inner periphery of said element to assist in axially positioning said element in the groove.

4. The combination set forth in claim 1 wherein said spacer has a series of circumferentially spaced slots for draining oil radially therethrough into said inner peripheral recess therein, said slots being located such that relative circumferential rotation between said spacer and said expander causes said outer crowns to come into wiping contact with the inner edges of said slots of said spacer.

5. The combination set forth in claim 1 wherein said expander is dimensioned such that said outer crowns and said legs thereof are spaced from the adjacent surface of said annular cylinder-engaging element, and wherein said spacer has a wall portion extending radially inward therefrom adapted to be interposed between said expander and said element to maintain said spacing therebetween.

6. The combination set forth in claim 5 wherein said expander has lip portions extending generally axially from said inner crowns for bearing radially outward against the inner peripheral edge of said annular cylinder-engaging element, said lip portions of said expander being spaced from the adjacent radial surface of the oil groove a distance sufficient to permit said outer crowns of said expander to contact said wall portion of said spacer during axial shifting movement of said expander in the oil groove.

7. An oil ring assembly for use in an oil groove of a piston adapted to reciprocate in a cylinder, said assembly comprising a pair of annular cylinder-engaging rail segments, an annular expander adapted to engage the inner peripheries of said rail segments for biasing said rail segments radially outward against the cylinder wall, and a floating spacer disposed axially between said rail segments for slidably supporting the rail segments in axially spaced relation in the oil groove, said spacer having openings extending radially therethrough for draining oil trapped between the outer peripheries of said rail segments radially inward into the oil groove, said spacer comprising an annular ring segment having an outer peripheral wall dimensioned axially for supporting said rail segments in axially spaced positions, said spacer having a pair of flanges extending radially inwardly from the top and bottom peripheral edges of said outer wall of said spacer for sliding engagement with the surfaces of said rail segments respectively adjacent thereto, said expander having a series of circumferentially spaced portions extending radially outwardly and received with a clearance fit between said spacer flanges to limit radially inward floating movement of said spacer relative to said rail segments.

8. An oil ring assembly for use in an oil groove of a piston adapted to reciprocate in a cylinder, said assembly comprising a pair of annular cylinder-engaging rail segments, an annular expander adapted to engage the inner peripheries of said rail segments for biasing said rail segments radially outward against the cylinder wall, and a floating spacer disposed axially between said rail segments for slidably supporting the rail segments in axially spaced relation in the oil groove, said spacer comprising an annular ring segment having an outer peripheral wall dimensioned axially for supporting said rail segments in axially spaced positions, said spacer having a pair of flanges extending radially inwardly from the top and bottom peripheral edges of said outer wall of said spacer for sliding engagement with the surfaces of said rail segments respectively adjacent thereto, said expander having a series of circumferentially spaced portions extending radially outwardly between and axially spaced from said rail segments and received with a clearance fit between said spacer flanges, said spacer being dimensioned to float radially between the cylinder wall and said circumferentially spaced portions of said expander.

9. An oil ring assembly for use in an oil groove of a piston adapted to reciprocate in a cylinder, said assembly comprising a pair of annular parted cylinder-engaging rails, an annular, radially corrugated expander having circumferentially spaced portions engaging the inner peripheries of said rails for biasing said rails radially outwardly and having other circumferentially spaced portions extending between and spaced axially from said rails, and a floating spacer disposed axially between said rails and having a pair of radial flanges for slidably supporting the rails in axially spaced relation in the oil groove, said flanges extending radially inwardly into the spaces between said rails and said other portions of said expander, said spacer having an outer diameter less than that of said rails in the operating condition thereof and the portion of the spacer axially intermediate said flanges having an inner diameter greater than the outermost diameter of said expander to permit said spacer to float radially and circumferentially relative to said rails and expander, the inner peripheries of said flanges being spaced radially outwardly of the radially innermost portions of said expander in all operative positions of said spacer to provide an oil venting clearance between said flanges and said expander.

10. The combination set forth in claim 9 wherein said expander comprises an imperforate ribbon of metal having parted ends disposed in circumferential abutment with one another in the operative condition of said ring assembly so that the expander is radially self-supporting.

References Cited in the file of this patent

UNITED STATES PATENTS 2,695,825    Estey _____ Nov. 30, 1954